United States Patent
Veerayya et al.

(10) Patent No.: US 11,940,527 B2
(45) Date of Patent: Mar. 26, 2024

(54) SYNTHETIC WEATHER SYSTEMS AND METHODS

(71) Applicant: Rockwell Collins, Inc., Cedar Rapids, IA (US)

(72) Inventors: Shivashankar Maddanimath Veerayya, Bangalore (IN); Vinay S. Huddar, Hyderabad (IN)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 599 days.

(21) Appl. No.: 17/130,553

(22) Filed: Dec. 22, 2020

(65) Prior Publication Data

US 2021/0278529 A1   Sep. 9, 2021

(30) Foreign Application Priority Data

Mar. 6, 2020   (IN) .............................. 202011009743

(51) Int. Cl.
| | |
|---|---|
| *G01S 13/95* | (2006.01) |
| *B64D 45/00* | (2006.01) |
| *B64D 47/08* | (2006.01) |
| *G01C 23/00* | (2006.01) |
| *G01S 13/86* | (2006.01) |
| *G06N 20/00* | (2019.01) |

(52) U.S. Cl.
CPC ............ *G01S 13/953* (2013.01); *B64D 45/00* (2013.01); *B64D 47/08* (2013.01); *G01C 23/005* (2013.01); *G01S 13/867* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 4,435,707 | A | * | 3/1984 | Clark .................... G01S 13/953 |
| | | | | 342/26 B |
| 6,828,922 | B1 | | 12/2004 | Gremmert et al. |
| 8,203,480 | B1 | * | 6/2012 | Woodell ................ G01S 7/4026 |
| | | | | 342/26 B |
| 9,407,826 | B1 | | 8/2016 | Tiana |
| 9,411,044 | B1 | | 8/2016 | Sperling et al. |

(Continued)

FOREIGN PATENT DOCUMENTS

CA   3044239   12/2019

OTHER PUBLICATIONS

European Patent Office, European Search Report dated Jul. 30, 2021 in Application No. 21160427.7.

(Continued)

*Primary Examiner* — Whitney Moore
(74) *Attorney, Agent, or Firm* — SNELL & WILMER L.L.P.

(57) ABSTRACT

A synthetic visual system for an aircraft may comprise: a camera in electronic communication with a controller; a radar system in electronic communication with the controller; a three-dimensional cockpit display in electronic communication with the controller via a synthetic weather system; and a tangible, non-transitory memory configured to communicate with the controller. The three-dimensional cockpit display may be configured to display a three-dimensional weather image based on correlated data between the radar system and the camera.

19 Claims, 6 Drawing Sheets

(56) References Cited

U.S. PATENT DOCUMENTS

| | | | |
|---|---|---|---|
| 9,702,726 B2 | 7/2017 | Turner et al. | |
| 10,318,057 B2 | 6/2019 | Kneuper et al. | |
| 2009/0273510 A1* | 11/2009 | Tillotson | G01S 13/953 342/26 B |
| 2016/0234441 A1 | 8/2016 | Tiana | |
| 2019/0389591 A1* | 12/2019 | Joshi | F02C 9/18 |

OTHER PUBLICATIONS

European Patent Office, European Office Action dated Dec. 19, 2023 in Application No. 21160427.7.

* cited by examiner

SYNTHETIC WEATHER SYSTEMS AND METHODS

CROSS-REFERENCE TO RELATED APPLICATIONS

This application is a non-provisional of, and claims priority to, and the benefit of India Provisional Application No. 202011009743 with DAS Code 8F7E, entitled "SYNTHETIC WEATHER SYSTEMS AND METHODS," filed on Mar. 6, 2020, which is hereby incorporated by reference in its entirety.

FIELD

The present disclosure relates to aircraft systems and, in particular, to synthetic systems for three-dimensional weather display for an aircraft.

BACKGROUND

During the day, pilots of aircraft may be able to co-relate weather information from various sources on an aircraft, such as XM Satellite Radio (XM), Uplink WX, WX Radar, or the like. However, at night or when whether such as rain or clouds reduce visibility, weather may be more difficult to co-relate via these sources. At night, when a pilot is flying through bad weather, such as hail, a thunderstorm, or the like, a pilot may be left interpreting the weather without visibility from the above sources.

SUMMARY

A synthetic vision system for an aircraft is disclosed herein. The synthetic vision system may comprise: a camera in electronic communication with a controller; a radar system in electronic communication with the controller; a three-dimensional cockpit display in electronic communication with the controller via a synthetic weather system; and a tangible, non-transitory memory configured to communicate with the controller, the tangible, non-transitory memory having instructions stored thereon that, in response to execution by the controller, cause the controller to perform operations comprising: receiving, by the controller, a reflectivity data from the radar system; receiving, by the controller, a visual data from the camera; and correlating, by the controller the reflectivity data to the visual data.

In various embodiments, the three-dimensional cockpit display is configured to display a correlated visual data from the reflectivity data. The synthetic vision system may further comprise a developer system in electronic communication with the controller. The developer system may be configured to compile the reflectivity data and the visual data. The reflectivity data may further comprise reflectivity as a function of elevation, longitude, latitude, and time. The camera may be coupled proximate a nose end of the aircraft. The radar system may be configured to receive weather data. The three-dimensional cockpit display may include a source of the radar system. The synthetic weather system may include a machine learning model. The machine learning model may be configured to continuously learn from the reflectivity data and the visual data.

A method of inferencing and display of weather for an aircraft is disclosed herein. The method may comprise: capturing, via a processor, a real-time reflectivity data from a radar system; capturing, via the processor, a real-time visual data from a camera; correlating, via the processor, the real-time reflectivity data to the real-time visual data when the visibility is clear; displaying, via the processor, a first estimated three-dimensional weather image based on correlating the real-time reflectivity data to the real-time visual data when visibility is clear; and displaying, via the processor, a second estimated three-dimensional weather image passed on the real-time reflectivity data when the visibility is less than clear.

In various embodiments, displaying the second estimated three-dimensional weather image may be based on receiving the real-time reflectivity data from the radar system. The processor may comprise machine learning model. The camera may be coupled proximate a nose of the aircraft. The real-time reflectivity data may further comprise reflectivity as a function of elevation, longitude, latitude, and time.

A method of developing a three-dimensional weather model for an aircraft cockpit display is disclosed herein. The method may comprise: compiling, via a processor, a reflectivity data from a radar system; compiling, via the processor, a visual data from a camera; correlating, via the processor, the reflectivity data to the visual data; and developing, via the processor, an estimated three-dimensional weather model based on correlating the reflectivity data to the visual data.

In various embodiments, compiling the reflectivity data and compiling the visual data may be received from a plurality of aircraft when the plurality of aircraft have clear visibility. The processor may comprise a machine learning model. The camera may be coupled proximate a nose of the aircraft. The reflectivity data may further comprise reflectivity as a function of elevation, longitude, latitude, and time.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures but may not be necessarily be repeated herein for the sake of clarity.

As used herein, "proximal" and/or "proximate" refers to a direction inward, or generally, towards the reference component.

A synthetic vision system for displaying three-dimensional weather during flight of an aircraft is disclosed herein. The synthetic vision system may correlate reflectivity data received from a radar system with actual visual data received from a camera and generate a weather model based on the correlated data. By utilizing the synthetic vision system during clear conditions, data may be compiled and fed to a machine learning model, such as a deep neural network (DNN) model to create a three-dimensional weather model based on having reflectivity data as an input. In this regard, a more accurate depiction of weather seen by a pilot of an aircraft may be displayed when visibility is less clear and/or at night.

Figure 1:
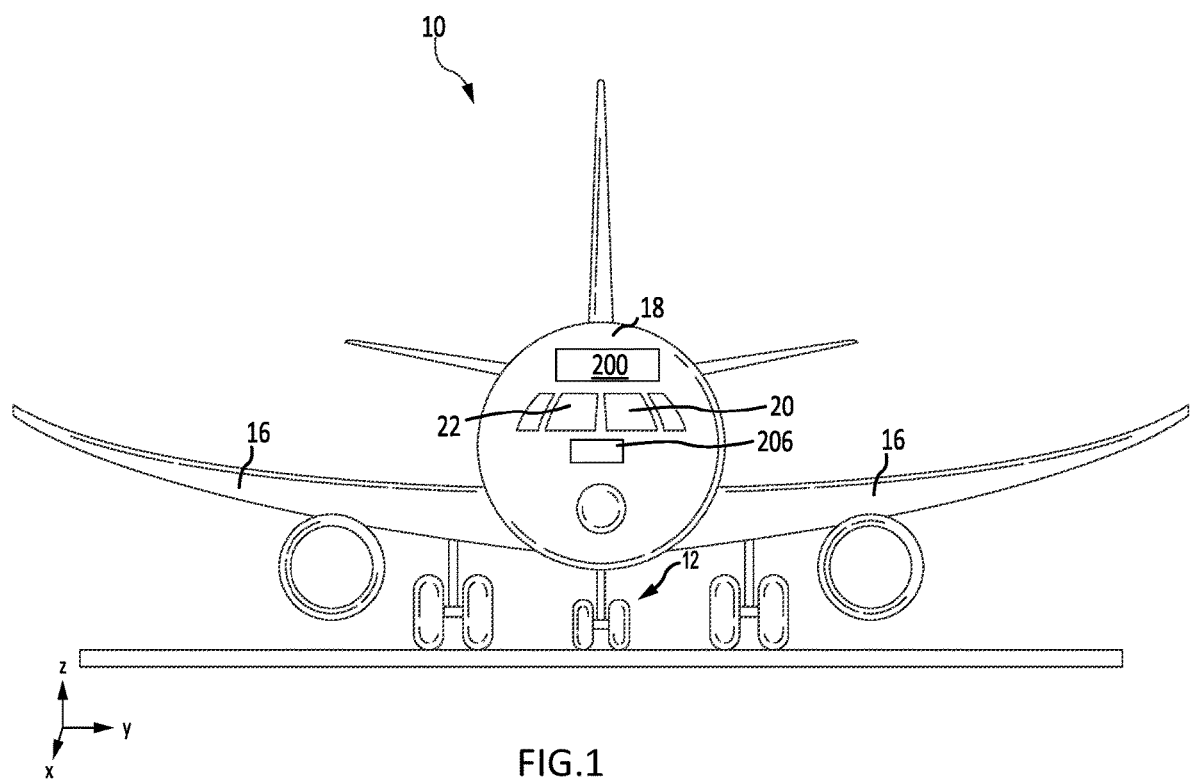
FIG. 1 illustrates an aircraft, in accordance with various embodiments.

With reference to FIG. 1, an aircraft 10 in accordance with various embodiments may comprise a fuselage 18, a landing gear system 12, and wings 16. The wings 16 extend outward from fuselage 18 and are configured to provide lift to the aircraft 10. The aircraft 10 comprises a cockpit 20 disposed at a nose end of aircraft 10. The cockpit 20 allows a pilot to see oncoming weather, or the like, during operation of the aircraft 10. Aircraft 10 may include a camera 206 disposed on a fuselage. In various embodiments, the visual camera may be disposed in any location on an aircraft where a view similar to a view from the cockpit 20 may be captured. For example, the camera 206 may be disposed on a nose end of the fuselage 18 proximate a pilot window 22, on a wings 16 at an angle to capture a similar view as a view form the cockpit 20, or the like. In various embodiments, aircraft 10 may include synthetic vision system 200 in communication with the camera 206.

Figure 2:
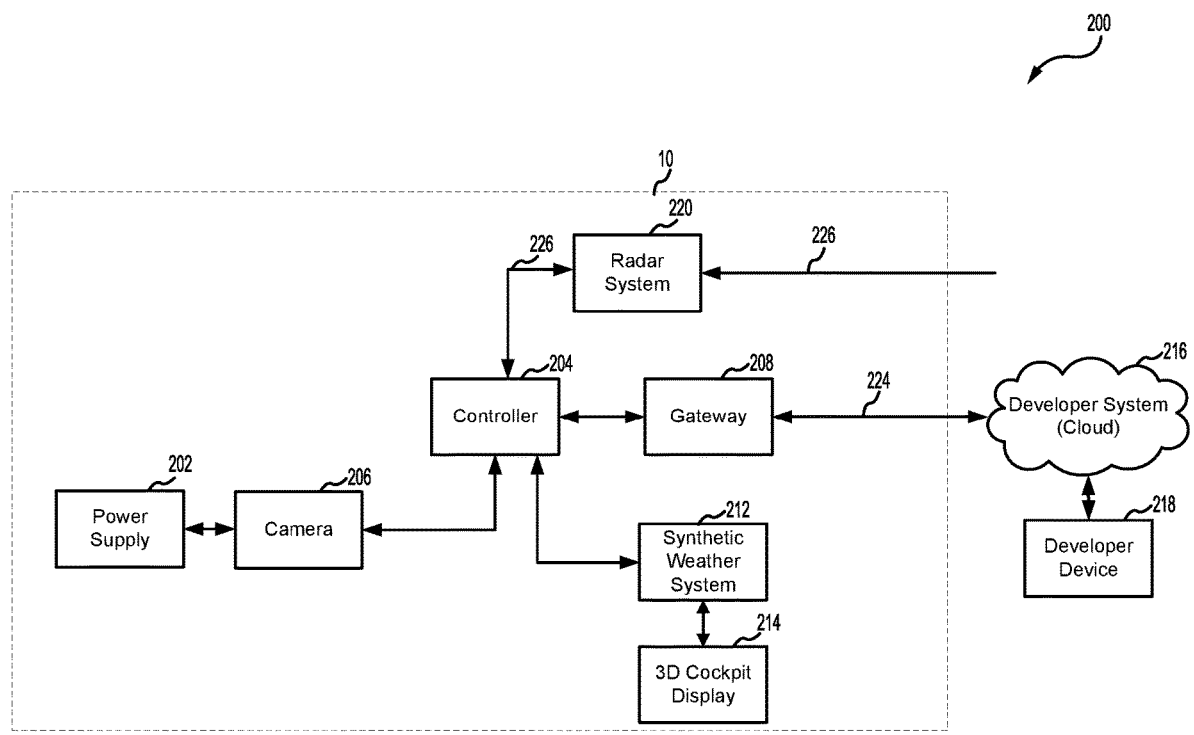
FIG. 2 illustrates a block diagram of a synthetic vision system, in accordance with various embodiments.

In various embodiments and with additional reference to FIG. 2, a block diagram for a synthetic vision system 200 of aircraft 10 is illustrated. System 200 includes a power supply 202, a camera 206, a controller 204, a network gateway 208, a synthetic weather system 212, a three-dimensional (3D) cockpit display 214, a developer system 216, a developer device 218, and a radar system 220.

Controller 204 may comprise at least one computing device in the form of a computer or processor, or a set of computers/processors, although other types of computing units or systems may be used. In various embodiments, controller 204 may be implemented as and may include one or more processors and/or one or more tangible, non-transitory memories and be capable of implementing logic. Each processor may be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 204 may comprise a processor configured to implement various logical operations in response to execution of instructions, for example, instructions stored on a non-transitory, tangible, computer-readable medium configured to communicate with controller 204. In various embodiments, controller 204 may be integrated into computer systems onboard an aircraft, such as, for example a flight control system. In various embodiments, controller 204 may be integrated with cameras, such as camera 206.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Controller 204 may be in electronic communication with power supply 202, camera 206, network gateway 208, synthetic weather system 212, 3D cockpit display 214, developer system 216, developer device 218, and radar system 220. Camera 206 may be coupled to or in electronic communication with various systems of aircraft 10 and may be configured to transmit real time, actual visual data to controller 204, thereby providing visual feedback about the weather to controller 204. Radar system 220 may be coupled to or in electronic communication with various systems of aircraft 10 and may be configured to transmit reflectivity data based on various weather sources, such as XM Satellite Radio (XM), Uplink WX, WX Radar, or the like. The visual feedback may be provided as an input to synthetic weather system 212. Similarly, radar system 220 may be provided as an input to synthetic weather system 212.

Power supply 202 may be in electronic communication with and/or configured to supply power to any of controller 204, camera 206, gateway 208, synthetic weather system 212, 3D cockpit display 214, and/or radar system 220. Power supply 201 may be configured to be controlled by controller 204 in response to commands from controller 204.

In various embodiments, developer system 216 may be configured as a central network element or hub to access various systems, engines, and components of system 200. Developer system 216 may comprise a network, computer-based system, and/or software components configured to provide an access point to various systems, engines, and components. Developer system 216 may be in operative and/or electronic communication with controller 204, camera 206, synthetic weather system 212, 3D cockpit display

214, radar system 220, and/or developer device 218 via gateway 208. In this regard, developer system 216 may allow communication from developer device 218 to systems and components of system 200. In various embodiments, developer system 216 may receive data 224 comprising real-time visual data from camera 206 and real-time reflectivity data from radar system 220. Developer system 216 may be configured to store and maintain data relating to actual weather in seen by aircraft 10 compared to radar weather located where the actual weather was seen. In this regard, actual weather data compared to radar weather data may be compiled over various aircrafts by developer system 216. Developer system 216 may store the data 224 using any suitable technique described herein or known in the art. In various embodiments, developer system 216 may include a machine learning model, such as a Deep Neural Network (DNN) model, or the like.

Developer device 218 may comprise software and/or hardware in communication with developer system 216 via a network comprising hardware and/or software configured to allow an aircraft operator, a user, and/or the like, access to developer system 216. Developer device 218 may comprise any suitable device that is configured to allow a user to communicate with a network and developer system 216. Developer device 218 may include, for example, a personal computer, servers, pooled servers, laptops, notebooks, hand held computers, personal digital assistants, cellular phones, smart phones (e.g., an IPHONE® device, a BLACKBERRY® device, an ANDROID® device, etc.), tablets, wearables (e.g., smart watches and smart glasses), Internet of Things (IOT) devices, or any other device capable of receiving data over network and/or the like and may allow a user to view reflectivity data and/or visual data.

Gateway 208 may be in electronic communication with controller 204 and developer system 216. Gateway 208 may comprise hardware and/or software configured as a communications interface which allows software and data to be transferred between aircraft 10 and external devices. Examples of communications interfaces may include a modem, a network interface (such as an Ethernet card), a communications port, BLUETOOTH®, TCP/IP, or near field communications (NFC), wifi and other radio frequency (RF) forms of communication and/or the like. In various embodiments, gateway 208 may be an internet of things (IoT) gateway in communication with a machine learning system. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a RF link, wireless and other communications channels. The system may include or interface with any of the foregoing accounts, devices, and/or a transponder and reader (e.g., RFID reader) in RF communication with the transponder (which may include a fob), or communications between an initiator and a target enabled by NFC. Typical devices may include, for example, a key ring, tag, card, cell phone, wristwatch, or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

In various embodiments, radar system 220 may receive data 226 comprising real-time reflectivity data associated with weather based on a location of aircraft 10. In various embodiments, data 226 may include other operational data such as, for example, coordinates of estimated weather relative to a location of the aircraft 10, or the like.

In various embodiments, synthetic weather system 212 may be configured as a network element or hub to access various systems and components of system 200. Synthetic weather system 212 may comprise a network, computer-based system, and/or software components configured to communicate with radar system 220. Radar system 220 may be in electronic communication with controller 204 and synthetic weather system 212. Synthetic weather system 212 may be configured to store and maintain data relating to aircraft 10 from radar system 220 and camera 206, such as, for example, actual weather data, estimated weather data, and corresponding location and time data. Synthetic weather system 212 may store the data 226 communicated through radar system 220 using any suitable technique described herein or known in the art. In various embodiments, radar system 220 may include a machine learning system, such as a DNN model, or the like. "A machine learning system," as describe herein, refers to a system configured to recognize patterns and computational learning, such as reprogramming the synthetic weather system 212 based on patterns recognized in the estimated weather data from data 226 and actual weather data from camera 206 and other computational learning.

Figure 3:
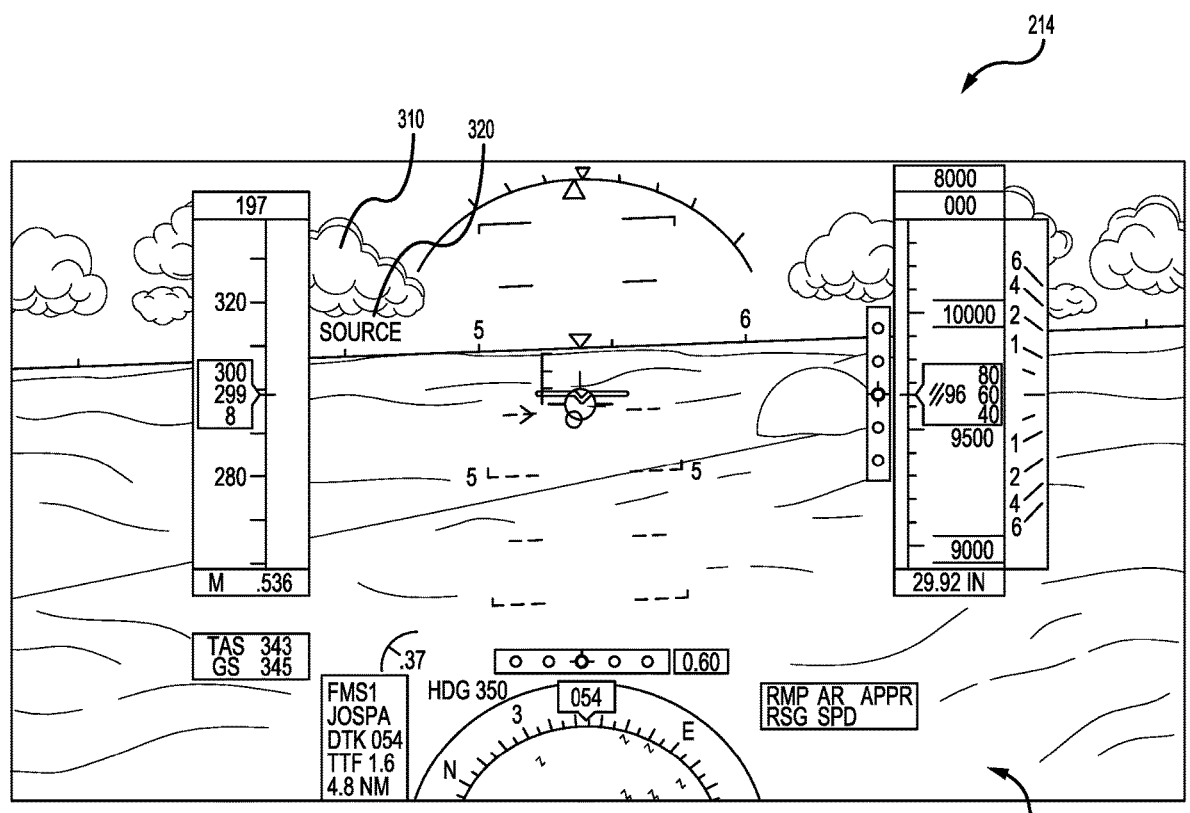
FIG. 3 illustrates a three-dimensional cockpit display, in accordance with various embodiments.

3D cockpit display 214 may comprise software and/or hardware in communication with synthetic weather system 212 via a network comprising hardware and/or software configured to provide a three-dimensional synthetic weather display to a pilot of an aircraft 10. With brief reference to FIG. 3, a 3D cockpit display 214, in accordance with various embodiments, is depicted. The 3D cockpit display 214 may comprise three-dimensional weather 310 (e.g., clouds, rain, hail, or the like) and three-dimensional terrain 330. In various embodiments, the 3D cockpit display 214 may further comprise a source 320 of the weather data. For example, the weather data may be obtained from XM Satellite Radio (XM), Uplink WX, WX Radar, or the like. In this regard, a pilot may know the source of the weather data being displayed in three-dimensions in the cockpit. In various embodiments, the 3D cockpit display 214 may display three-dimensional terrain 330 and three-dimensional weather for between 20 and 80 nautical miles, or between 30 and 70 nautical miles, or between 35 and 65 nautical miles.

Figure 4:
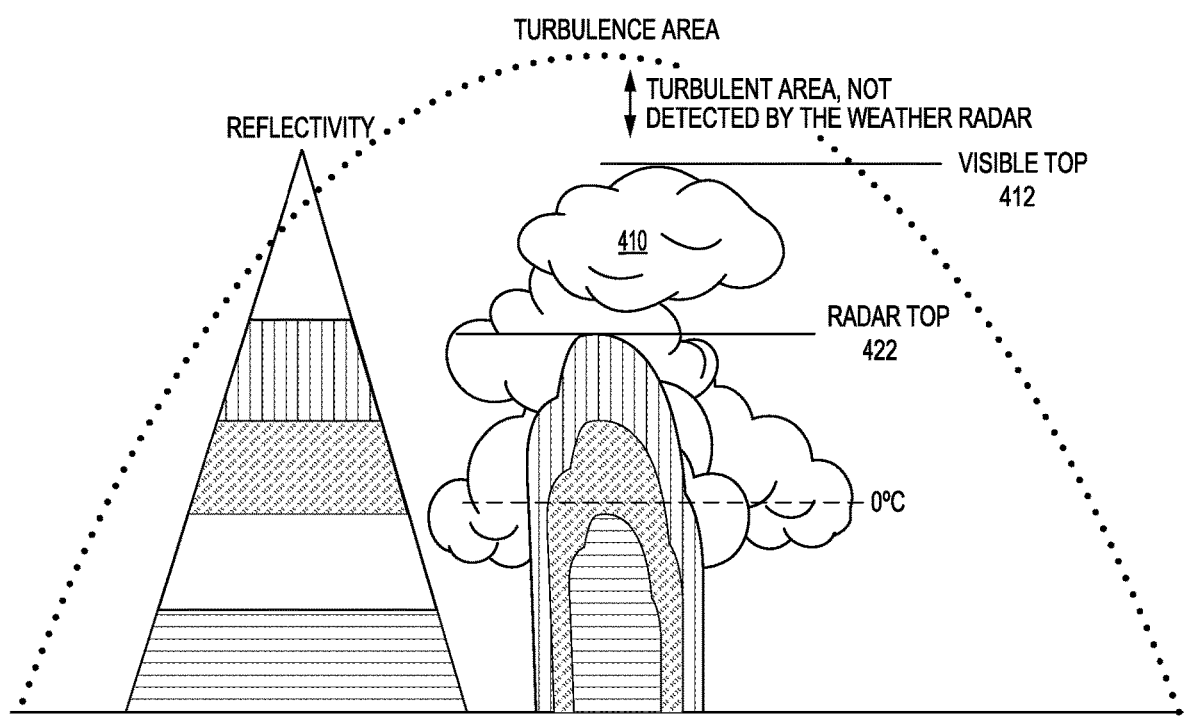
FIG. 4 illustrates a reflectivity chart at various altitudes for a radar system, in accordance with various embodiments.

Referring now to FIG. 4, a reflectivity chart at various altitudes for a radar system is illustrated, in accordance with various embodiments. In various embodiments, a visible top 412 of a cloud 410 may have a higher altitude relative to a radar top 422 determined by reflectivity data received by a weather source. As such, with combined reference to FIGS. 2 and 4, data 226 received by radar system 220 may be correlated with visual data received by camera 206 to correlate real time visual information from the camera 206 to the reflectivity data received from the weather source. In this regard, a pilot may receive a three dimensional view of the weather that more closely depicts the actual weather, as opposed to a partial view provided from radar system 220 on its own.

The system 200 may allow for data collection and model development to be implemented on future aircrafts and or retrofitted on existing aircrafts. In this regard, developer system 216 may be in communication with a plurality of aircrafts including aircraft 10. Each aircraft in the plurality of aircraft may be configured to correlate actual visual data from a camera 206 with reflectivity data from radar system 220. Each aircraft may capture this data in clear visibility conditions during the day. In this regard, the developer system 216 may receive sizable actual visual data from camera 206 and estimated visual data from radar system 220 in various weather conditions. The data may then be used to train machine learning model, such as a deep neural network (DNN) model, to correlate images between the camera 206 and the corresponding reflectivity data 226 from various weather sources. In this regard, when the camera 206 is unable to provide a visual image due to visibility issues, such as at night, or during a storm, the 3D cockpit display 214 may project a more accurate three-dimensional image of the weather relative to typical radar systems and displays.

In various embodiments, the system 200 may allow for real-time inferencing and display. For example, real-time reflectivity data 226 may be fed to the synthetic weather system 212 and real-time visual data may be fed to the synthetic weather system 212 via the camera 206. The synthetic weather system 212 may include machine learning model, such as a deep neural network (DNN) model, configured to correlate the real-time visual data with the real-time reflectivity data 226. In this regard, the real-time inferencing and display of the synthetic weather system 212 will become more accurate in the synthetic weather display in 3D cockpit display 214 over time as the synthetic weather system 212 continuously learns.

Figure 5:
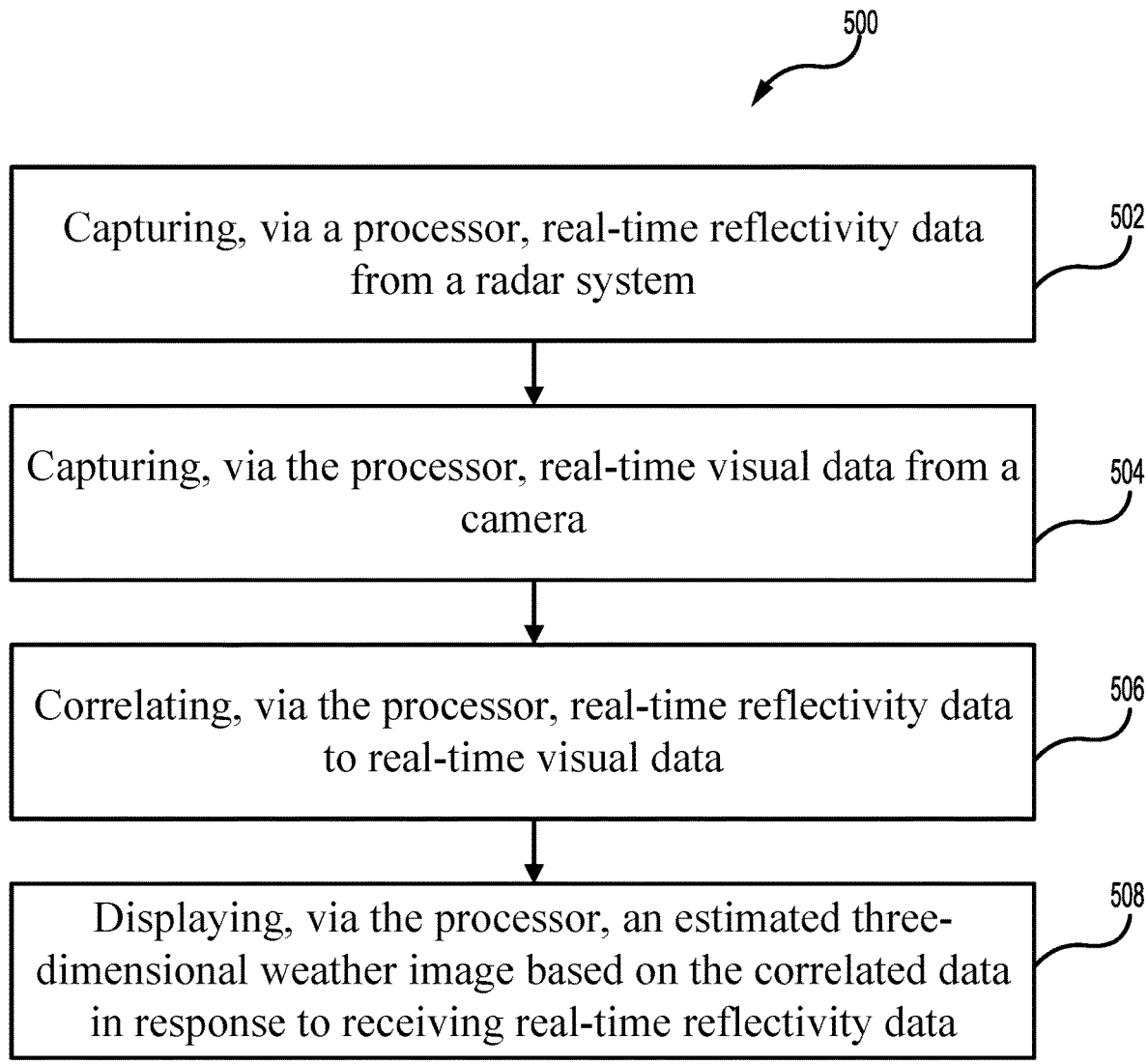
FIG. 5 illustrates a method of inferencing and display of weather, in accordance with various embodiments.

Referring now to FIG. 5, a method of inferencing and display of weather 500, in accordance with various embodiments, is illustrated. The method 500 comprises capturing, via a processor, real-time reflectivity data from a radar system (step 502). The real-time reflectivity data may be captured in relation to an aircraft (e.g., aircraft 10 from FIG. 1). The reflectivity data may be captured within a predetermined range of an aircraft's synthetic vision system. For example, reflectivity data may be captured over a range that would be displayed in a cockpit on 3D cockpit display (e.g., for a range between 20 nautical miles and 80 nautical miles, or the like). The reflectivity data may include reflectivity from a radar system as a function of positional coordinates (e.g., altitude, longitude, and latitude) and time.

The method 500 may further comprise capturing, via the processor, real-time visual data from a camera (step 504). The camera may be coupled to an aircraft (e.g., camera 206 from FIG. 1). The real time visual data may include weather images, such as clouds, rain, hail, or the like as a function of positional coordinates (e.g., altitude, longitude, and latitude) and time.

The method 500 may further comprise correlating, via the processor, real time reflectivity data to real-time visual data (step 506). In this regard, a compiled reflectivity data from a radar system and a compiled visual data from a camera may be used to modify and/or adjusted a real-time reflectivity data to a predicted real-time visual data. For example, the processor may store the real-time reflectivity data and the real-time visual data, determine a correlation between the two, and predict a real-time visual image of weather based on a respective real-time reflectivity data.

The method 500 may further comprise displaying, via the processor, an estimated three-dimensional weather image based on the correlated data in response to receiving real-time reflectivity data (step 508). The three-dimensional weather image may be displayed on a 3D cockpit display, such as 3D cockpit display 214 from FIG. 2. In this regard, a more accurate weather image may be provided to a pilot during operation of an aircraft 10 from FIG. 1.

Figure 6:
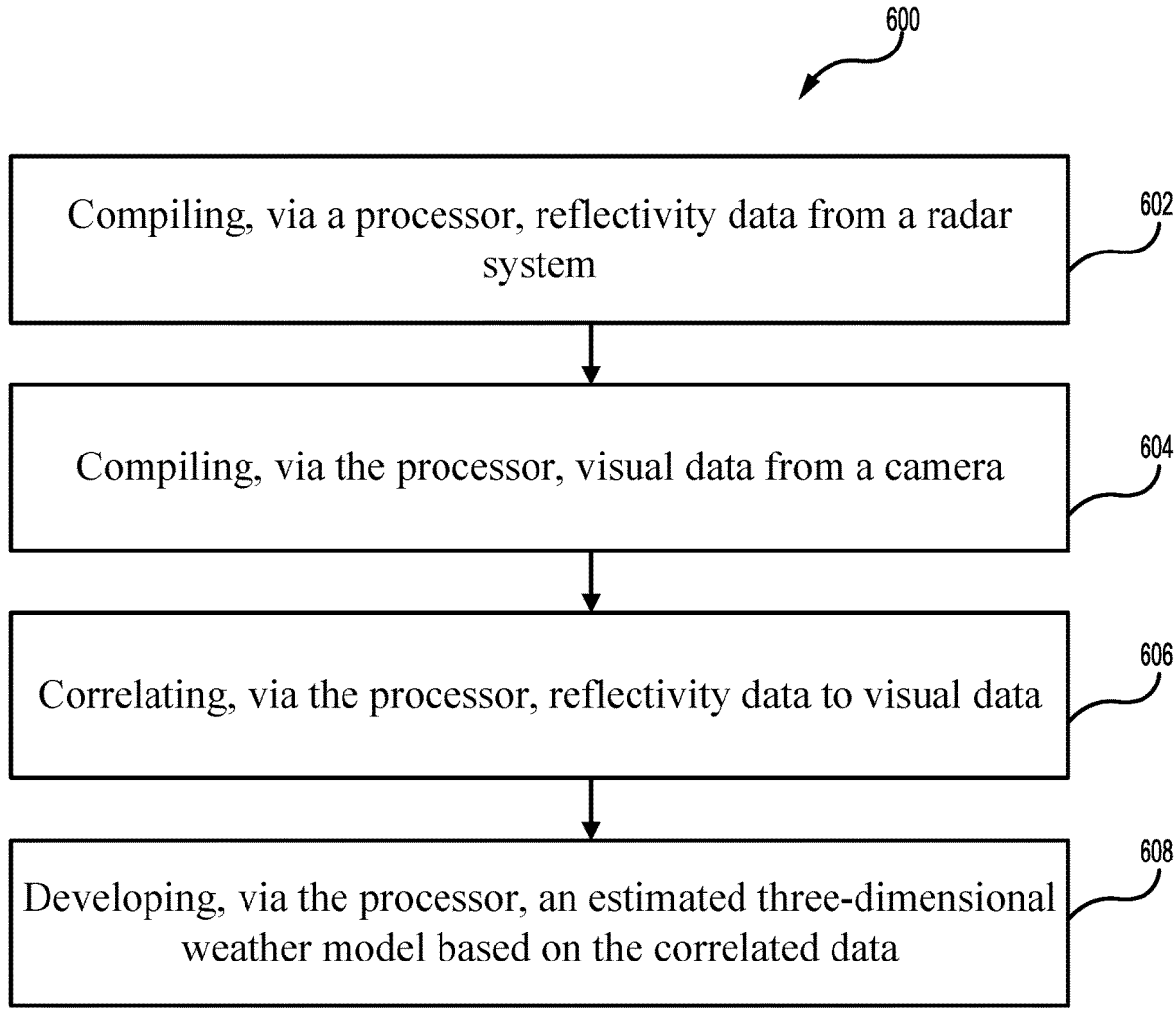
FIG. 6 illustrates a method of developing a three-dimensional weather model, in accordance with various embodiments.

Referring now to FIG. 6, a method of developing a three-dimensional weather model 600, in accordance with various embodiments, is illustrated. The method 600 comprises compiling, via a processor, reflectivity data from a radar system (step 602). The reflectivity data may be captured in relation to an aircraft (e.g., aircraft 10 from FIG. 1). The reflectivity data may be captured within a predetermined range of an aircraft's synthetic vision system. For example, reflectivity data may be captured over a range that would be displayed in a cockpit on 3D cockpit display (e.g., for a range between 20 nautical miles and 80 nautical miles, or the like). The reflectivity data may include reflectivity from a radar system as a function of positional coordinates (e.g., altitude, longitude, and latitude) and time. The reflectivity data may be recorded over a plurality of aircrafts in various weather conditions during clear visibility, or the like.

The method 600 may further comprise compiling, via the processor, visual data from a camera (step 504). The camera may be coupled to an aircraft (e.g., camera 206 from FIG. 1). The visual data may include weather images, such as clouds, rain, hail, or the like as a function of positional coordinates (e.g., altitude, longitude, and latitude) and time. The visual data may be recorded over a plurality of aircrafts in various weather conditions during clear visibility, or the like. In this regard, a relatively clear image of the weather may be compared to the reflectivity data from step 602.

The method 600 may further comprise correlating, via the processor, reflectivity data to vision data (step 606). In this regard, a compiled reflectivity data from a radar system and a compiled visual data from a camera may be used to modify and/or adjusted a real-time reflectivity data to a predicted real-time visual data. The compiled reflectivity data and the compiled visual data may be an input into a machine learning model, such as a deep neural network (DNN) model, to create a weather model correlating reflectivity data to actual visual data of weather. In various embodiments, the processor may be a component of the machine learning model, such as the deep neural network (DNN) model.

The method 600 may further comprise developing, via the processor, an estimated three-dimensional weather model based on the correlated data (step 508). The three-dimensional weather may be deployed on a 3D cockpit display for a plurality of aircraft, such as 3D cockpit display 214 from FIG. 2 for an aircraft 10. In this regard, a more accurate weather displays may be provided to a pilot during operation of an aircraft 10 from FIG. 1.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACK-BERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); JAVA® 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

As used herein, "transmit" may include sending electronic data from one system component to another over a network connection. Additionally, as used herein, "data" may include encompassing information such as commands, queries, files, data for storage, and the like in digital or any other form.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A synthetic vision system for an aircraft, comprising:
a camera in electronic communication with a controller;
a radar system in electronic communication with the controller;
a three-dimensional cockpit display in electronic communication with the controller via a synthetic weather system; and
a tangible, non-transitory memory configured to communicate with the controller, the tangible, non-transitory memory having instructions stored thereon that, in response to execution by the controller, cause the controller to perform operations comprising:
receiving, by the controller, a reflectivity data from the radar system;
receiving, by the controller, a visual data from the camera;
correlating, by the controller, the reflectivity data to the visual data; and
displaying, by the controller, a first estimated three-dimensional image based on correlating the reflectivity data to the visual data in response to visibility being clear, the first estimated three-dimensional image including three-dimensional weather and a three-dimensional terrain.

2. The synthetic vision system of claim 1, wherein the three-dimensional cockpit display is configured to display a correlated visual data from the reflectivity data.

3. The synthetic vision system of claim 1, further comprising a developer system in electronic communication with the controller.

4. The synthetic vision system of claim 3, wherein the developer system is configured to compile the reflectivity data and the visual data.

5. The synthetic vision system of claim 1, wherein the reflectivity data further comprises reflectivity as a function of elevation, longitude, latitude, and time.

6. The synthetic vision system of claim 1, wherein the camera is coupled proximate a nose end of the aircraft.

7. The synthetic vision system of claim 1, wherein the radar system is configured to receive weather data.

8. The synthetic vision system of claim 1, wherein the three-dimensional cockpit display includes a source of the radar system.

9. The synthetic vision system of claim 1, wherein the synthetic weather system includes a machine learning model.

10. The synthetic vision system of claim 9, wherein the machine learning model is configured to continuously learn from the reflectivity data and the visual data.

11. A method of inferencing and display of weather for an aircraft, the method comprising:
   capturing, via a processor, a real-time reflectivity data from a radar system;
   capturing, via the processor, a real-time visual data from a camera;
   correlating, via the processor, the real-time reflectivity data to the real-time visual data when visibility is clear; and
   displaying, via the processor, a first estimated three-dimensional weather image based on correlating the real-time reflectivity data to the real-time visual data when visibility is clear, the first estimated three-dimensional weather image including a first three-dimensional weather and a first three-dimensional terrain; and
   displaying, via the processor, a second estimated three-dimensional weather image passed on the real-time reflectivity data when the visibility is less than clear, the second estimated three-dimensional weather image including a second three-dimensional weather and a second three-dimensional terrain.

12. The method of claim 11, wherein displaying the second estimated three-dimensional weather image is based on receiving the real-time reflectivity data from the radar system.

13. The method of claim 11, wherein the processor comprises a machine learning model.

14. The method of claim 11, wherein the camera is coupled proximate a nose of the aircraft.

15. The method of claim 11, wherein the real-time reflectivity data further comprises reflectivity as a function of elevation, longitude, latitude, and time.

16. A method of developing a three-dimensional weather model for an aircraft cockpit display, the method comprising:
   compiling, via a processor, a reflectivity data from a radar system to form a compiled reflectivity data set;
   compiling, via the processor, a visual data from a camera to form a compiled visual data set;
   training, via the processor, a machine learning model to correlate a future visual data from the camera and a corresponding future reflectivity data from the radar system based on the compiled reflectivity data set and the compiled visual data set; and
   developing, via the processor, an estimated three-dimensional weather model based on the machine learning model, the three-dimensional weather model configured to generate an estimated three-dimensional weather image and a three-dimensional terrain image based on the future visual data and the corresponding future reflectivity data.

17. The method of claim 16, wherein compiling the reflectivity data and compiling the visual data is received from a plurality of aircraft when the plurality of aircraft have clear visibility.

18. The method of claim 16, wherein the camera is coupled proximate a nose of an aircraft.

19. The method of claim 16, wherein the reflectivity data further comprises reflectivity as a function of elevation, longitude, latitude, and time.

* * * * *